United States Patent [19]
Thompson et al.

[11] 4,057,465
[45] Nov. 8, 1977

[54] NUCLEAR REACTOR AUXILIARY HEAT REMOVAL SYSTEM

[75] Inventors: Robert E. Thompson, Bethel Park; Bill L. Pierce, Whitehall Borough, both of Pa.

[73] Assignee: Westinghouse Electric Corporation, Pittsburgh, Pa.

[21] Appl. No.: 603,072

[22] Filed: Aug. 8, 1975

[51] Int. Cl.² .............................................. G21C 9/00
[52] U.S. Cl. .......................................... 176/38; 176/60
[58] Field of Search .......................... 176/37, 38, 58, 59, 176/60, 20

[56] References Cited
U.S. PATENT DOCUMENTS
3,666,623  5/1972  Harand et al. ..................... 176/60

FOREIGN PATENT DOCUMENTS
604,314  5/1956  Canada ........................... 176/60

Primary Examiner—Verlin R. Pendegrass
Assistant Examiner—Ralph Palo
Attorney, Agent, or Firm—M. S. Yatsko; Z. L. Dermer

[57] ABSTRACT

An auxiliary heat removal system to remove residual heat from gas-cooled nuclear reactors. The reactor coolant is expanded through a turbine, cooled in a heat exchanger, and compressed by a compressor before re-entering the reactor coolant. The turbine powers both the compressor and the pump which pumps a second fluid through the heat exchanger to cool the reactor coolant. A pneumatic starter is utilized to start the turbine, thereby making the auxiliary heat removal system independent of external power sources.

16 Claims, 3 Drawing Figures

NUCLEAR REACTOR AUXILIARY HEAT REMOVAL SYSTEM

BACKGROUND OF THE INVENTION

This invention relates generally to nuclear reactors and more particularly to an auxiliary heat removal system for use in gas-cooled nuclear reactors.

A nuclear reactor produces heat by the fissioning of a fissile material which is fabricated into fuel elements and assembled into a nuclear core. In gas-cooled nuclear reactors, the heat produced by the fissile materials is transferred to an inert gas such as helium or argon, which is then circulated, typically, through turbines, heat exchangers, and compressors before being returned to the nuclear core. The power output of the turbines is then converted into electrical power.

The use of a nuclear reactor as a heat source introduces the need for a cool-down system to remove, residual heat. A nuclear reactor does not cease generating heat immediately upon being shut down. Delayed neutrons continue to cause fission to occur for a period of time after shutdown. For a longer period of time, dependent upon the reactor characteristics and prior operating history, the products resulting from the fission of the fuel continue to decay, and in decaying release energy. Additionally, the fuel elements themselves are often operated at temperatures above the level at which structural damage would occur if cooling were not provided. These abovementioned factors mandate the requirement that adequate cooling be provided for the nuclear core after the reactor is shut down, to remove the residual heat retained in the core. Typically, cooldown under normal conditions, such as for refueling, is achieved through the use of the normal circulatory system. The turbines, heat exchangers, and compressors continue operations until the desired temperature level of the nuclear core is attained. In the unlikely event of a emergency condition, it may not be possible for the normal circulatory system to remove the heat generated by the nuclear core. For example, one of the emergency conditions which is postulated, although its probability is extremely small, is the complete failure of the normal circulatory system to operate. In the event of such an occurrence, a separate system must be provided to remove the heat generated by the nuclear core after it has been shut down.

In the prior art, at least two different systems have been proposed to remove the residual heat retained after reactor shut-down. One system involves installing a redundant system to provide circulation whenever the normal circulatory system is inoperable. This emergency system generally is dependent upon an external power source and external controls. As such, these external controls and the external power source must be operable under all possible emergency conditions, a difficult and expensive requirement.

Another method utilized in the prior art is to remove the residual heat through convection circulation of the reactor coolant. Although this system removes the dependence upon an external power source, it has disadvantages. The natural convection circulation may not be adequate to remove sufficient heat from the nuclear core. Additionally, the use of the natural convection circulation system is dependent upon the reactor gravitational orientation.

SUMMARY OF THE INVENTION

The above-mentioned problems of the prior art are eliminated by this invention by providing an auxiliary heat removal system for use with gas-cooled nuclear reactors to remove residual heat generated by the nuclear reactor core without the necessity of an external power source of the use of convection flow. The hot gaseous reactor coolant is removed from the core and supplied to a gas turbine, through which the hot gas is expanded. From the gas turbine, the coolant is supplied to a means for removing heat from the coolant, where the gaseous coolant transfers its heat to a second coolant; flows to a compressing means; is compressed and is resupplied to the nuclear core. The gas turbine is mechanically coupled to, and drives both the means for compressing the gaseous coolant, and a pump which is utilized for circulating the second coolant. A pneumatic starter provides starting of the gas turbine upon the occurrence of an emergency condition. As such, the auxiliary heat removal system utilizes the residual heat produced by the reactor core to power the system for cooling the reactor core, and is not dependent upon an external power source.

BRIEF DESCRIPTION OF THE DRAWINGS

Reference is now made to the description of the preferred embodiment, taken in connection with the accompanying drawings, in which.

DESCRIPTION OF THE PREFERRED EMBODIMENT

Figure 1:
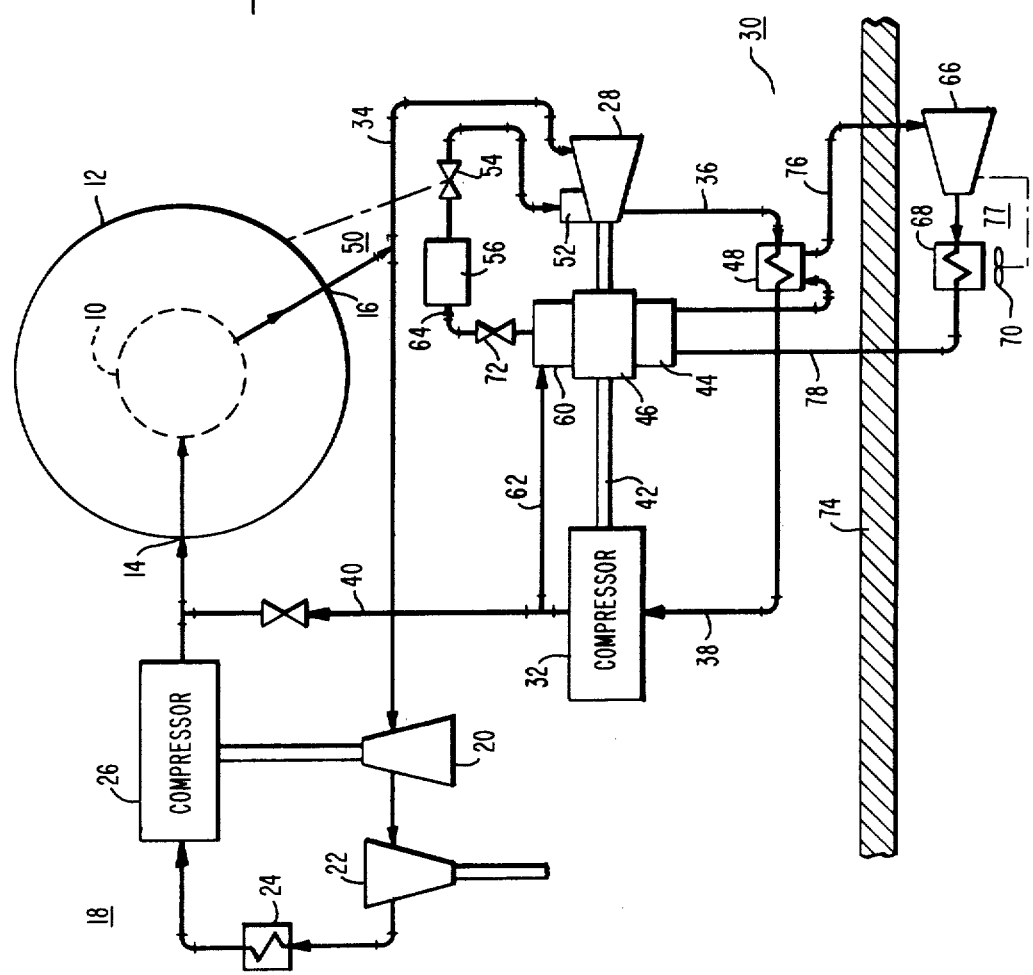
FIG. 1 is a schematic illustration of the auxiliary heat removal system of this invention.

Throughout the description which follows, like reference characters indicate like elements in the various figures of the drawings.

Referring now more particularly to FIG. 1, a nuclear core 10, comprised of a plurality of fuel elements (not shown), which are fabricated of a fissionable material such as uranium or plutonium, is situated within a nuclear reactor pressure vessel 12. The pressure vessel 12 has coolant flow inlet means 14 and coolant flow outlet means 16 through which the primary fluid, or reactor coolant, which in the case of gas-cooled nuclear reactor may be an inert gas such as helium or argon, can enter and exit from the nuclear core 10. Connected to the inlet means 14 and the outlet means 16 is the primary coolant flow system 18, one loop of which typically includes a compressor turbine 20, a work turbine 22, heat exchange means 24 and compression means 26. During normal reactor operations, the gaseous coolant exits through the outlet means 16 of the pressure vessel 12, passes through the compressor turbine 20, and then passes through the work turbine 22. The compressor turbine 20 is mechanically connected to the compression means 26, and generally provides the powering force for operating the compression means 26. The work turbine 22 is connected to means (not shown) by which the energy generated in the work turbine 22 is used to power the load. After exiting from the work turbine 22, the coolant flows through heat exchange means 24, where it is cooled by means (not shown), exits from the heat exchange means 24 and enters the compression means 26. In the compression means 26, the coolant is compressed, passes to the pressure vessel inlet means 14, and reenters the nuclear core 10. As it passes through the core 10, the coolant receives the heat which has been generated by the core, and flows to the pressure vessel outlet means 16, where the described flow cycle is repeated. The above described primary coolant flow loop is well known in the art and is described in greater detail in, for example, U.S. Pat. No. 3,663,364.

The auxiliary heat removal system, used during emergency or other conditions when the primary coolant flow system 18 is not operational, comprises a gas turbine 28, a heat exchanging means 30 such as a heat exchanger, and compression means 32, such as a compressor, for compressing the reactor coolant, conduit means 34, such as piping, for supplying the reactor coolant from the nuclear core 10 to the gas turbine 28, conduit means 26 for supplying the reactor coolant from the gas turbine 28 to the heat exchanging means 30, means such as a conduit 38 for supplying the reactor coolant from the heat exchanging means 30 to the compression means 32 and conduit means 40 such as piping, for supplying the reactor coolant from the compression means 32 to the reactor core 10 complete the flow cycle. Although the conduit means 34 for supplying the reactor coolant from the nuclear core 10 to the gas turbine 28 are shown as being connected to the pressure vessel outlet means 16, such an interconnection is not a requirement. The requirement for the conduit 34 for supplying coolant from the core 10 to the gas turbine 28 is that these conduit means 34 come into fluid communication with the gaseous reactor coolant after it has exited from the nuclear core 10 and has been heated. Likewise, the conduit means 40 for supplying coolant from the compression means 32 to the nuclear core 10 do not necessarily have to utilize the pressure vessel inlet means 14, but instead may traverse a different path so long as the conduit means 40 supply the coolant prior to its entering the nuclear core 10.

The compression means 32 for compressing the reactor coolant, which may comprise a compressor, is mechanically coupled by means 42 such as the turbine shaft to the gas turbine 28. Through such a connection, the compression means 32 are driven by the gas turbine 28. Also mechanically coupled to the gas turbine 28 is a fluid pump 44 which is part of the heat exchanging means 30 for removing heat from the reactor coolant. As shown, the fluid pump 44 is connected to the gas turbine 28 by a power take-off gear box 46.

The fluid pump 44 pumps a second fluid coolant, which may be a liquid such as water or a gas such as helium or air. The second fluid coolant, also part of the heat exchanging means 30 for removing heat from the first reactor coolant, passes in thermal communication with the first reactor coolant, and receives heat from the first coolant. This transfer of heat from the reactor coolant to the second fluid coolant may occur, for example, in heat exchanger 48.

Means 50 for starting the gas turbine 28 are mechanically connected to the gas turbine 28. The starting means 50 may comprise a pneumatic starter 52, a starter valve 54, and a container 56 of starter fluid. Although shown as a separate element, the starter valve 54 may be incorporated integrally within the pneumatic starter 52. The starter fluid, which in this case is the same gas as the reactor coolant, is pressurized within the container 56. The starter valve 54 is connected to instrumentation (not shown) within the pressure vessel 16, the function of which will be hereinafter explained. Also included as part of the means 50 for starting the gas turbine 28 are a fluid starter pump 60, an extraction means 62 for diverting a portion of the reactor coolant exiting from the compression means 32 to the container 56 of starter fluid and conduit means 64. The starter fluid pump 60 is mechanically connected to, and driven by, the gas turbine 28 through the turbine shaft 42 and the power take-off gearbox 46.

The operation of the auxiliary heat removal system is substantially as follows. Upon the occurrence of a condition which would cause the reactor to shut down, the instrumentation (not shown) which initiates the shutdown of the reactor sends a signal to the starter valve 54. The starter valve 54, upon receipt of such a signal, opens, and the starter fluid in the container 56, which is under pressure, flows to the pneumatic starter 52. This flow of starter fluid then activates the pneumatic starter 52, causing the gas turbine 28 to begin operating. The suction force created by the starting of the gas turbine 28 causes the gaseous reactor coolant to flow from the nuclear core 10 and through the supply means 34 to the turbine 28. The hot gas entering the turbine 28 is expanded through the turbine 28 causing the gas turbine 28 to rotate. The gas exits from the gas turbine 28 and flows through supply means 36 to the reactor coolant heat removal means 30. The heat in the reactor coolant is then transferred to the second fluid coolant such as in the heat exchange means 48 and the reactor coolant then flows to the compression means 32. The gas is then compressed by the compression means 32, and is reinserted, as a cool gas, into the nuclear core 10, where it will receive heat from the core 10 and begin the described flow cycle again.

The work extracted by the gas turbine 28 is utilized to power the compression means 32. As such, the auxiliary heat removal system is operating as a type of closed Brayton cycle.

In addition to powering the compression means 32, the gas turbine 28 also powers the fluid pump 44 which circulates the second fluid coolant. The second fluid coolant is pumped from the fluid pump 44, passes in thermal communication with the reactor coolant, receives heat from the reactor coolant, and is then either rejected or cooled. For example, if the second fluid coolant is water, the water could pass through a water turbine 56 and to a heat exchange means 68, which may be a water-to-air heat exchanger. The water would then exit from the heat exchanger 68 and be recirculated by the pump 44. The water turbine 66, which would be inserted into this means 77 for removing heat from the second fluid coolant, could be utilized to drive a means 70 for circulating air over the heat exchanger 68, which means 70 facilitates the removal of heat from the second fluid coolant. As can be seen, the entire heat removal system is independent of any external power source, but rather depends upon the heat of the reactor core 10 which is to be removed to supply the necessary power to cool the nuclear core 10.

By a careful matching of the characteristics of the gas turbine 28 and the compression means 32, the gas turbine 28 and the compressor 32 will be able to circulate the reactor coolant until such time as the reactor core 10 is cooled sufficiently. However, at some point in time, the heat of the reactor coolant exiting from the core 10 will be insufficient to power the gas turbine 28. Once this occurs, the reactor coolant will no longer be circulated, and any heat being produced by nuclear core 10 will be retained within the pressure vessel 16 or the core 10 as sensible heat. After some additional time, this sensible heat may become large enough to cause structural damage, so it may be desirable to provide a means for restarting the gas turbine 28. This restarting of the gas turbine 28 is accomplished by the starter fluid pump 60 and the extraction means 62.

Once the gas turbine 28 is started, the starter valve 54 closes and does not permit starter fluid to flow to the pneumatic starter 52. A small amount of reactor coolant is extracted, or "bled", by the extraction means 62. This small amount of coolant extracted, or starter fluid, is pumped by the starter fluid pump 60, which in turn is driven by the gas turbine 28 and the starter fluid is supplied to the container 56 of starter fluid. This starter fluid is continuously supplied until such time as the container 56 of starter fluid is filled and under a sufficient pressure to operate the pneumatic starter 52. Once the supply of starter fluid is sufficient, means 72 such as a valve will prohibit the introduction of any more starter fluid into the container 56. In this manner, a supply of starter fluid in the container 56 will be available to restart the gas turbine 28.

As previously mentioned, once the gas turbine 28 has stopped operating, the temperature of the reactor coolant in the nuclear core 10 may rise, requiring additional circulation to cool the core 10. The starter valve 54 is responsive to the temperature of the reactor coolant in the nuclear core 10. This may be accomplished by various means, one of which may be a Bourdon tube. (A Bourdon tube, not part of this invention, is a generally semi-circular closed tube containing a fixed volume of gas. As the temperature surrounding the tube rises, the temperature causes a corresponding increase in the pressure of the gas within the tube. This increased pressure causes the semi-circular tube to begin to straighten. This straightening of the tube can then be connected to the starter valve 54 such that, upon the attainment of a predetermined movement, which corresponds to a predetermined reactor coolant temperature, the valve will open and allow the starter fluid to flow through it to the pneumatic starter 52.) Once the starter valve 54 opens, the supply of starter fluid 56 then causes the pneumatic starter 52 to operate, thereby starting the gas turbine 28, and the heat removal system functions as previously described. By providing a self-contained means for restarting the operation of the auxiliary heat removal system, the heat generated by the nuclear core 10 will be removed without the need of external controls, and the heat will not cause damage to structural components. The operation of the auxiliary heat removal system functions in an intermittent manner, and whenever the temperature in the nuclear core 10 rises above a predetermined level, cooling will occur.

In addition to being utilized for land based nuclear reactor plants, the auxiliary heat removal system of this invention can be used effectively in mobile installations, such as for ship propulsion, where one of the hypothetical accidents could be the beaching or sinking of the ship. For use in, for example, a ship, the reactor system, including the auxiliary heat removal system, would be installed as heretofore described, excepting that the means 77 for removing heat from the second fluid coolant, mainly, the heat exchanger 68, the means 70 for circulating air, and the liquid turbine 66, would be located outside the containment vessel (partially illustrated and designated by the numeral 74). Upon a beaching of the ship, the auxiliary heat removal system would function as described. In the event the ship, and the reactor, would sink, the piping penetrations 76, 78 at the location where they pass through the containment vessel 74 would be sheared off by means such as explosives (not shown) which would be responsive to the increased pressure on the containment vessel 74 caused by the water. The interior of the containment vessel 74 would remain sealed except for the two openings where the piping 76, 78 passed through the vessel wall 74. Then, instead of utilizing a heat exchanger 68, the fluid pump 44 would draw water (as the second fluid coolant) in from the ocean through the piping 78, pass it in thermal communication with the reactor coolant, and after the water has received heat from the reactor coolant, the water would be rejected back into the ocean.

A similar system, wherein the second fluid coolant is water, could be utilized for land based plants wherein the supply of water necessary to remove heat from the reactor coolant could be a river, lake, or similar supply of water.

Additionally, in the unlikely event of an accident causing a disruption of the normal second fluid coolant flow, the piping connections 76, 78 could be sheared off, and the pump 44 could draw air from the atmosphere in, pass the air in thermal communication with the reactor coolant, and reject it out into the atmosphere thereafter. In this manner, adequate redundancy is provided to assure that the reactor coolant will at all times have a supply of coolant adequate to remove heat from it.

Figure 2:
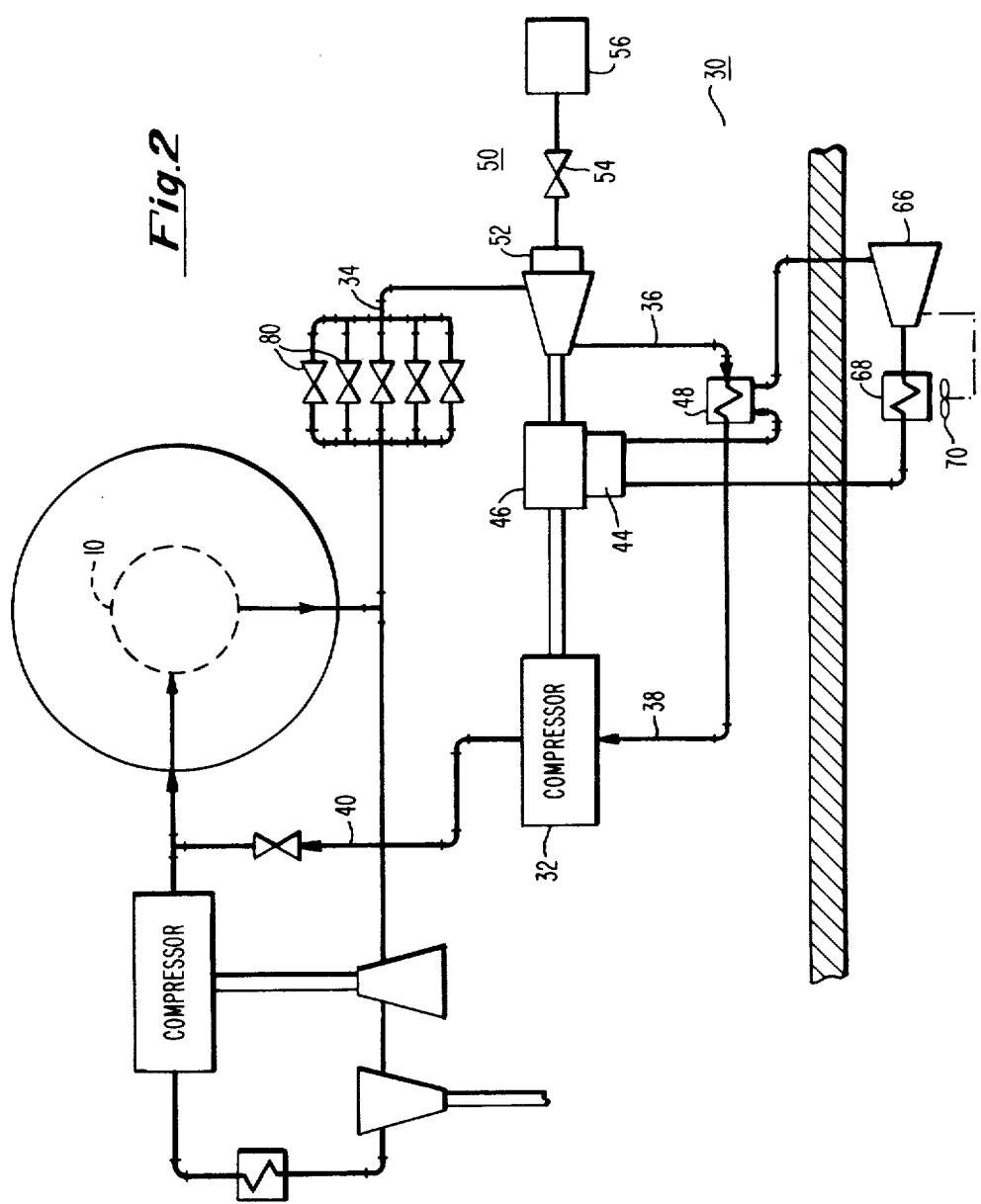
FIG. 2 is a modification of the system shown in FIG. 1.

Referring now to FIG. 2, a modification of the auxiliary heat removal system of FIG. 1, a plurality of temperature-dependent flow controllers 80 are installed, in parallel, in the means 34 for supplying the reactor coolant from the core 10 to the gas turbine 28. The flow controllers 80 are dependent upon the temperature of the reactor coolant, and regulate quantity of reactor coolant supplied to the gas turbine 28. The flow controllers 80, which may be temperature-dependent valves, operate to increase the amount of reactor coolant flowing to the gas turbine 28 when the temperature of the reactor coolant is high, and to decrease the amount of reactor coolant flowing to the gas turbine 28 when the reactor coolant temperature decreases. This may be accomplished, for example, by having each of the flow controllers 80 closed, or stop the flow of reactor coolant through it, at different temperatures. Therefore, as the reactor coolant temperature decreases, first one and then more valves will close until all the flow controllers 80 are closed when the reactor is cold. This temperature dependence could be accomplished utilizing means such as the Bourden tube utilized to operate the pneumatic starter, except that as the temperature decreased, the flow controllers 80 would stop the flow of coolant through them.

By utilizing the flow controllers 80 in the means 34 for supplying coolant from the core 10 to the gas turbine 28, the necessity of extracting a quantity of coolant from the means 40 for supplying coolant from the compression means 32 to the core 10 could be eliminated.

If the extraction is eliminated, the container 56 of starter fluid could be filled and pressurized prior to installation in the system, and could only be utilized once, when the emergency condition occurred. This modification, as opposed to the system shown in FIG. 1, will operate continuously until the reactor has cooled down such that the nuclear core 10 will not generate enough heat to cause any structural damage.

Figure 3:
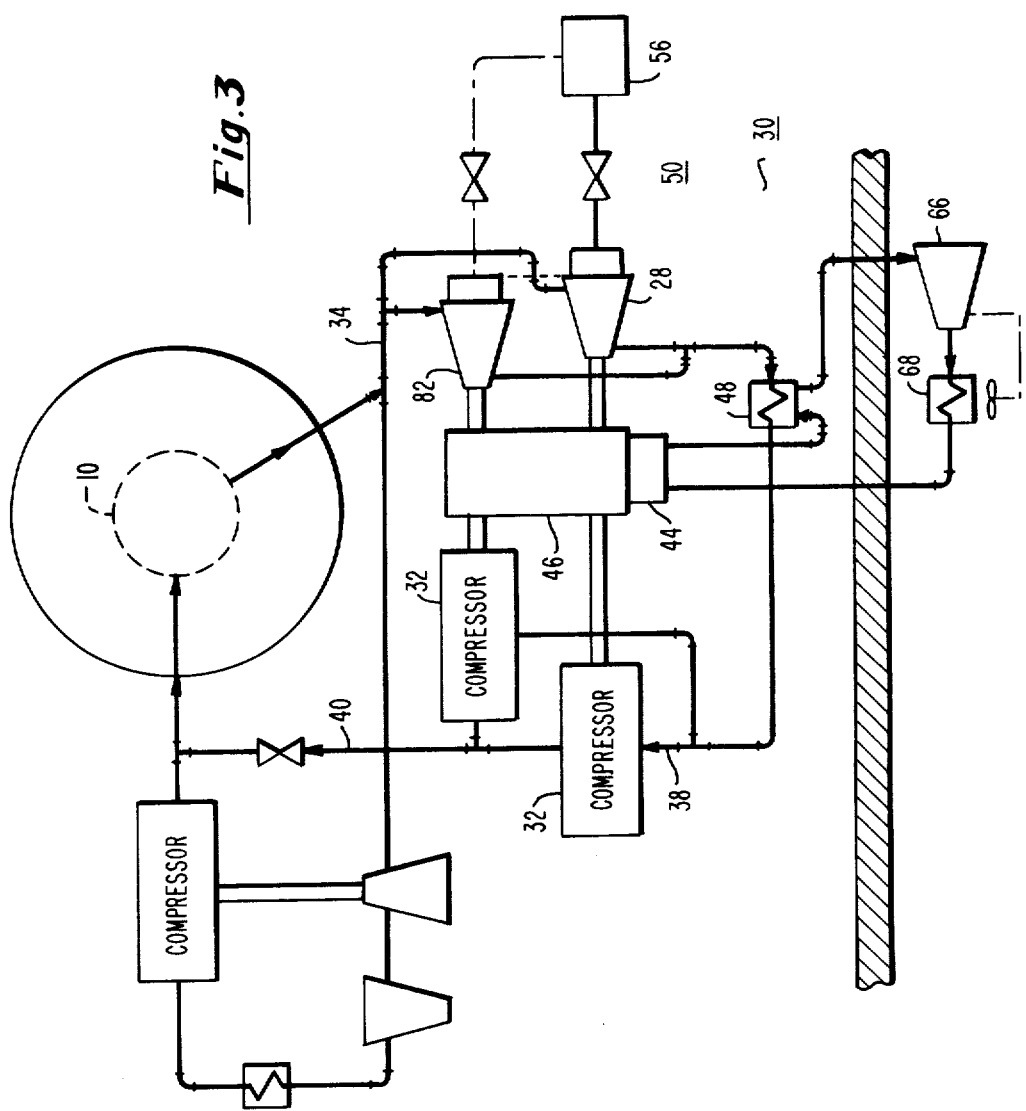
FIG. 3 is a modification of the system shown in FIG. 1.

A third modification is schematically illustrated in FIG. 3. In this modification, a second gas-powered turbine 82, herein called a supporting turbine 82, is installed in parallel with the gas turbine 28. The reactor coolant flowing through the supply means 34 would pass through, and power, both the gas turbine 28 and the supporting turbine 82. The supporting turbine 82, like the gas turbine 28, is mechanically connected to, and powers, both the fluid pump 44, through the power take-off gearbox 46, and the compression means 32. However, the supporting turbine 82 is larger than the gas turbine 28, and requires a higher temperature of reactor coolant flow through it to be able to operate than the gas turbine 28 requires. The operation of this modification then occurs with, as soon as the emergency condition occurs, both the supporting turbine 82 and gas turbine 28 are operational. As the temperature of the reactor coolant decreases, the supporting turbine 82 ceases operating prior to the ceasing operation of the gas turbine 28, and all the reactor coolant flows through the operating gas turbine 28. If the reactor coolant temperature then increases to the level wherein the supporting turbine 82 can operate, the gas turbine 28 will supply the motive force to start the larger supporting turbine 82. In this modification, the smaller gas turbine 82 will operate continuously, whereas the larger supporting turbine 82 will operate intermittently. As before, by a careful matching of the turbine 28, 82, and compressor 32 characteristics, the auxiliary heat removal system will be able to function until there is substantially no probability that the core 10 will become hot enough to cause damage.

Thus, it can be seen that this invention provides a means for removing heat from a nuclear reactor during an emergency condition which does not require an external power source, and which is not dependent upon a gravitational orientation for convection flow.

We claim:

1. An auxiliary heat removal system for use in a gas-cooled nuclear reactor system to remove residual heat retained in the reactor core after reactor shutdown comprising:
    a first recycling flow loop for conducting gaseous primary cooling fluid heated by said reactor core, said first flow loop including said reactor core, a gas turbine, a first heat exchanging means, and a compression means connected in series therein, and first conduit means for transporting said primary fluid from said core to said gas turbine, said first heat exchanging means, and said compression means in series, and for returning said primary fluid to said reactor core;
    a second flow loop for conducting a second cooling fluid, said second flow loop including a fluid pump, second conduit means for transporting said second fluid from said fluid pump to said first heat exchanging means, and means for removing heat from said second cooling fluid, said second fluid being in thermal communication with said primary fluid in said first heat exchanging means;
    said fluid pump and said compression means being mechanically coupled to, and driven by, said gas turbine; and
    starter means for initiating operation of said gas turbine, said starter means being responsive to preselected conditions of said nuclear reactor system and comprising:
    a pneumatic starter;
    a container of starter fluid in fluid communication with said starter, said starter fluid being pressurized within said container, and;
    a starter valve disposed in the flow path between said pneumatic starter and said container, said starter valve controlling the flow of said starter fluid from said container to said pneumatic starter.

2. The system according to claim 1 wherein said starter means comprises:
    extracting means for diverting a portion of said primary fluid exiting from said compression means to said container of starter fluid, and;
    a starter-fluid pump mechanically coupled to, and driven by, said gas turbine, said starter fluid pump pumping said primary fluid through said extracting means.

3. The system according to claim 1 wherein said starter valve is responsive to the temperature of said primary fluid and said nuclear core such that, upon attainment of a predetermined temperature, said starter valve permits said starter fluid to flow from said container to said pneumatic starter.

4. The system according to claim 1 wherein a power take-off gearbox is mechanically coupled to said gas turbine; and
    said fluid pump is mechanically coupled to said gearbox, said gas turbine driving said fluid pump through said gearbox.

5. The system according to claim 1 wherein said second fluid is a liquid, and
    said means for removing heat from said second fluid comprises:
    a liquid-to-air secondary heat exchanger through which said second fluid flows;
    circulating means for forcing air flow over said heat exchanger; and
    a liquid turbine in fluid communication with said second fluid, said second fluid passing through said liquid turbine before entering said heat exchanger, said liquid turbine being interconnected to said circulating means such that said liquid turbine drives said circulating means.

6. The system according to claim 5 wherein said second fluid is water.

7. The system according to claim 1 wherein said second fluid is air;
    said first heat exchanging means comprises a gas-to-air primary heat exchanger; and,
    said second fluid is rejected to the atmosphere after said second fluid has received heat from said primary fluid.

8. The system according to claim 1 wherein said second fluid is water;
    said first heat exchanging means comprises;
    a supply of water;
    third conduit means for transporting said water from said supply of water to said fluid pump, and from said first heat exchanging means to said supply of water; and
    rejecting said second fluid to said supply of water after said second fluid has received heat from said primary coolant.

9. An auxiliary heat removal system for use in a gas-cooled nuclear reactor system to remove residual heat retained in the reactor core after reactor shutdown comprising:
    a first recycling flow loop for conducting gaseous primary cooling fluid heated by said reactor core, said first flow loop including said reactor core, a gas turbine, a first heat exchanging means, and a compression means connected in series therein, and first conduit means for transporting said primary fluid from said core to said gas turbine, said first heat exchanging means, and said compression means in series, and for returning said primary fluid to said reactor core;

a second flow loop for conducting a second cooling fluid, said second flow loop including a fluid pump, second conduit means for transporting said second fluid from said fluid pump to said first heat exchanging means, and means for removing heat from said second fluid, said second fluid being in thermal communication with said primary fluid in said first heat exchanging means;

said fluid pump and said compression means being mechanically coupled to, and driven by, said gas turbine;

starter means for initiating operation of said gas turbine, said starter means being responsive to preselected conditions of said nuclear reactor system; and a plurality of temperature-dependent flow controllers parallelly installed in said first conduit means between said core and said gas turbine, said flow controllers regulating the quantity of said primary fluid being supplied to said gas turbine.

10. The system according to claim 4 wherein said flow controllers are dependent upon the temperature of said primary fluid; and said flow controllers regulating the quantity of said primary fluid being supplied to said gas turbine such that increases in the temperature of said primary fluid increase the quantity of said primary fluid being supplied to said gas turbine.

11. The system according to claim 10 wherein said flow controllers are temperature-dependent valves.

12. The system according to claim 9 wherein said second fluid is a liquid, and said means for removing heat from said second fluid comprises:

a liquid-to-air secondary heat exchanger through which said second fluid flows;

circulating means for forcing air flow over said heat exchanger; and a liquid turbine in fluid communication with said second fluid, said second fluid passing through said liquid turbine before entering said heat exchanger, said liquid turbine being interconnected to said circulating means such that said liquid turbine drives said circulating means.

13. An auxiliary heat removal system for use in a gas-cooled nuclear reactor system to remove residual heat retained in the reactor core after reactor shutdown, comprising:

a first recycling flow loop for conducting gaseous primary cooling fluid heated by said reactor core, said first flow loop including said reactor core, a gas turbine, a first heat exchanging means, and a compression means connected in series therein, and first conduit means for transporting said primary fluid from said core to said gas turbine, said first heat exchaning means, and said compression means in series, and for returning said primary fluid to said reactor core;

a second flow loop for conducting a second cooling fluid, said second flow loop including a fluid pump, second conduit means for transporting said second fluid from said fluid pump to said first heat exchanging means, and means for removing heat from said second cooling fluid, said second fluid being in thermal communication with said primary fluid in said first heat exchanging means;

said fluid pump and said compression means being mechanically coupled to, and driven by, said gas turbine;

starter means for initiating operation of said gas turbine, said starter means being responsive to preselected conditions of said nuclear reactor system;

a supporting turbine connected in parallel with said gas turbine, said supporting turbine being of the gaseous-powered variety, said primary fluid flowing through said supporting turbine, said supporting turbine being driven by said, primary fluid said supporting turbine being larger than said gas turbine, said supporting turbine requiring higher primary fluid temperatures for operation than said gas turbine, whereby as said primary fluid temperature decreases, said supporting turbine ceases operating prior to said gas turbine ceasing operating; and supporting turbine starting means for initiating operation of said supporting turbine.

14. The system according to claim 13 wherein said supporting turbine is mechanically coupled to, and drives said compression and said fluid pump.

15. The system according to claim 13 wherein said means for starting operation of said supporting turbine comprises said gas turbine providing the starting force for said supporting turbine.

16. The system according to claim 13 wherein said second fluid is a liquid, and said means for removing heat from said second fluid comprises:

a liquid-to-air secondary heat exchanger through which said second fluid flows;

circulating means for forcing air flow over said heat exchanger; and a liquid turbine in fluid communication with said second fluid, said second fluid passing through said liquid turbine before entering said heat exchanger, said liquid turbine being interconnected to said circulating means such that said liquid turbine drives said circulating means.

* * * * *